(12) United States Patent
Sasa

(10) Patent No.: US 7,989,517 B2
(45) Date of Patent: Aug. 2, 2011

(54) ACTINIC RAY CURABLE COMPOSITION, ACTINIC RAY CURABLE INK, AND IMAGE FORMATION PROCESS EMPLOYING THE SAME

(75) Inventor: Nobumasa Sasa, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 257 days.

(21) Appl. No.: 11/560,479

(22) Filed: Nov. 16, 2006

(65) Prior Publication Data

US 2007/0123600 A1 May 31, 2007

(30) Foreign Application Priority Data

Nov. 28, 2005 (JP) .................................. 2005-341662

(51) Int. Cl.
- *C08G 59/68* (2006.01)
- *C08F 2/48* (2006.01)
- *C08J 7/14* (2006.01)

(52) U.S. Cl. .......... 522/31; 522/121; 427/508; 427/511; 427/512; 427/514; 427/517

(58) Field of Classification Search .................. 522/7, 15, 522/31, 122, 121; 427/508–517
See application file for complete search history.

(56) References Cited

U.S. PATENT DOCUMENTS

| | | | |
|---|---|---|---|
| 6,306,555 B1 * | 10/2001 | Schulz et al. | 430/270.1 |
| 2002/0086161 A1 * | 7/2002 | Smetana et al. | 428/413 |
| 2004/0186195 A1 * | 9/2004 | Suzuki et al. | 522/31 |
| 2005/0250868 A1 * | 11/2005 | Suzuki et al. | 522/25 |
| 2007/0039517 A1 * | 2/2007 | Tsuchimura | 106/14.31 |
| 2008/0044149 A1 * | 2/2008 | Kanno et al. | 385/123 |

* cited by examiner

*Primary Examiner* — Mark Eashoo
*Assistant Examiner* — Jessica Paul
(74) *Attorney, Agent, or Firm* — Lucas & Mercanti, LLP

(57) ABSTRACT

Disclosed is an actinic ray curable composition comprising a cationically polymerizable compound, an onium salt, and a compound represented by formula 1, $$R^1\{(CR^2R^3)mOH\}n \qquad \text{Formula 1}$$

wherein $R^1$ represents a condensed ring group; $R^2$ and $R^3$ independently represent a hydrogen atom, a substituted or unsubstituted alkyl group, a substituted or unsubstituted aryl group or a substituted or unsubstituted aralkyl group; m represents an integer of from 2 to 4; and n represents an integer of from 1 to 10.

15 Claims, 2 Drawing Sheets

ACTINIC RAY CURABLE COMPOSITION, ACTINIC RAY CURABLE INK, AND IMAGE FORMATION PROCESS EMPLOYING THE SAME

This application is based on Japanese Patent Application No. 2005-341662 filed on Nov. 28, 2005 in Japanese Patent Office, the entire content of which is hereby incorporated by reference.

FIELD OF THE INVENTION

The present invention relates to an actinic ray curable composition, an actinic ray curable ink, and an image formation process employing the same.

BACKGROUND OF THE INVENTION

Known is an actinic ray curable composition comprising a cationically polymerizable compound, an onium salt as a photoinitiator, and a compound represented by formula I

    Formula I wherein $R^{11}$ represents a condensed ring group; $R^{12}$ and $R^{13}$ independently represent a hydrogen atom, a substituted or unsubstituted alkyl group, a substituted or unsubstituted aryl group or a substituted or unsubstituted aralkyl group; m represents an integer of 1; and n represents an integer of not less than 1. (See, for example, published Japanese translation of PCT application No. 2005-520007.)

However, when printing is carried out employing the actinic ray curable ink employing the compound represented by formula I above disclosed in the published Japanese translation of PCT application No. 2005-520007 to print an ink image particularly on a recording sheet into which the ink permeates, the resulting ink image shows poor curability, resulting in bleeding of cured images and in lowering of resistance in washing and physical rubbing resistance.

SUMMARY OF THE INVENTION

An object of the invention is to provide an actinic ray curable composition and an actinic ray curable ink, which are excellent in curability, bleeding resistance, resistance in washing, and rubbing resistance, and to provide an image formation process employing the actinic ray curable ink.

DETAILED DESCRIPTION OF THE INVENTION

Figure 1:
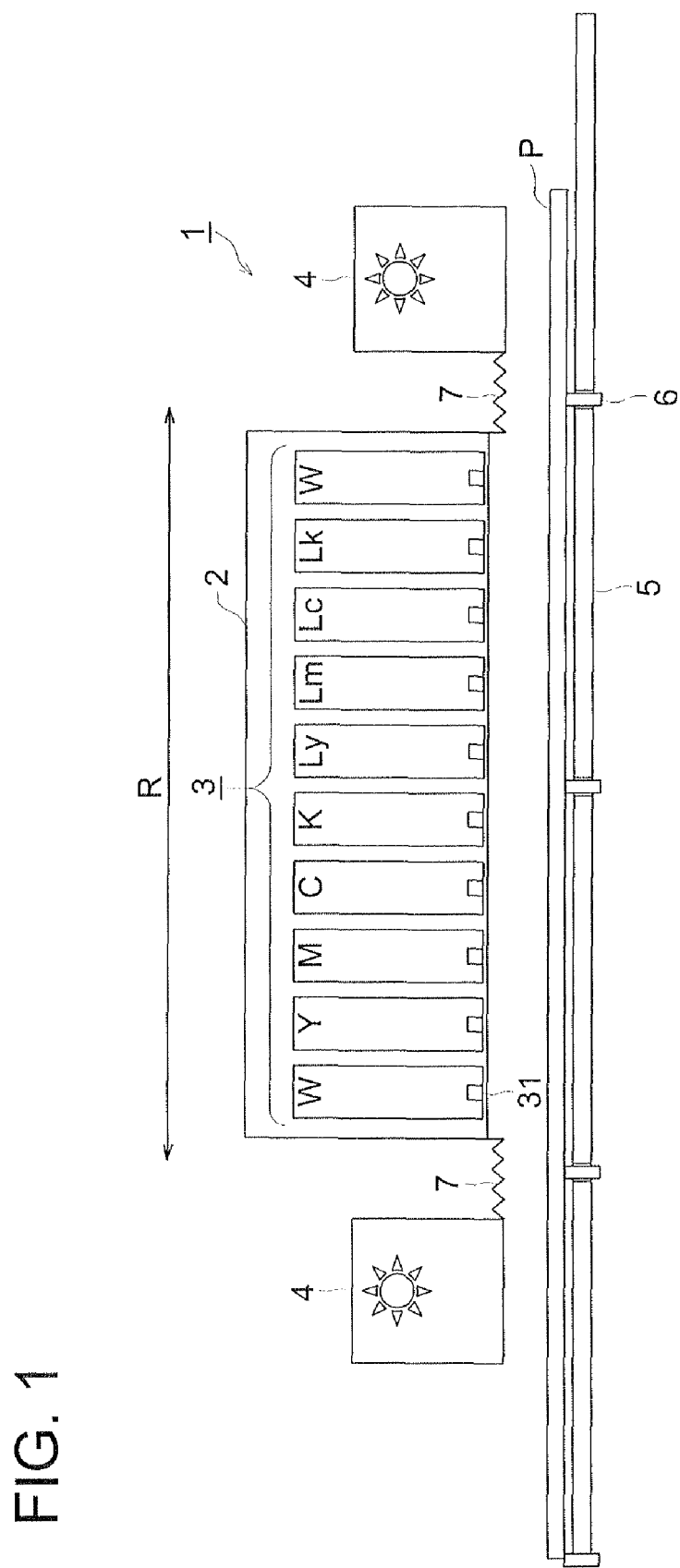
FIG. 1 shows a front view of one embodiment of the main section of an ink-jet recording apparatus.

The above object can be attained by any one of the following constitutions.

1. An actinic ray curable composition comprising a cationically polymerizable compound, an onium salt, and a compound represented by formula 1,

    Formula 1 wherein $R^1$ represents a condensed ring group; $R^2$ and $R^3$ independently represent a hydrogen atom, a substituted or unsubstituted alkyl group, a substituted or unsubstituted aryl group or a substituted or unsubstituted aralkyl group; m represents an integer of from 2 to 4; and n represents an integer of from 1 to 10.

2. The actinic ray curable composition of item 1 above, wherein the condensed ring represented by $R^1$ is selected from the group consisting of an anthracene ring, a fluorene ring, a pyrene ring, a chrysene ring, a phenanthrene ring, an anthraquinone ring, a perylene ring, a carbazole ring, a phenothiazine ring, a thioxanthone ring, a thianthrene ring, a benzanthracene ring, a naphthacene ring, and a triphenylene ring.

3. The actinic ray curable composition of item 1 above, wherein n of formula 1 represents an integer of from 1 to 4.

4. The actinic ray curable composition of item 1 above, wherein the onium salt is an iodonium salt or a sulfonium salt.

5. The actinic ray curable composition of item 1 above, wherein the cationically polymerizable compound is an oxetane ring-containing compound.

6. The actinic ray curable composition of item 1 above, wherein the cationically polymerizable compound is an oxirane ring-containing compound.

7. The actinic ray curable composition of item 1 above, wherein the content of the compound represented by formula 1 is from 0.01 to 20% by weight, the content of the cationically polymerizable compound is from 5 to 95% by weight, and the content of the onium salt is from 0.2 to 20% by weight.

8. The actinic ray curable composition of item 1 above, wherein the composition has a viscosity at 25° C. of from 5 to 500 mPa·s.

9. The actinic ray curable composition of item 1 above, wherein the composition further contains at least one selected from the group consisting of polyesters, polyurethanes, vinyl resins, acryl resins, rubber resins, and waxes.

10. An actinic ray curable ink comprising a cationically polymerizable compound, an onium salt, a pigment and a compound represented by formula 1 above.

11. The actinic ray curable ink of item 10 above, wherein the condensed ring is selected from the group consisting of an anthracene ring, a fluorene ring, a pyrene ring, a chrysene ring, a phenanthrene ring, an anthraquinone ring, a perylene ring, a carbazole ring, a phenothiazine ring, a thioxanthone ring, a thianthrene ring, a benzanthracene ring, a naphthacene ring, and a triphenylene ring.

12. The actinic ray curable ink of item 10 above, wherein n of formula 1 represents an integer of from 1 to 4.

13. The actinic ray curable ink of item 10 above, wherein the onium salt is an iodonium salt or a sulfonium salt.

14. The actinic ray curable ink of item 10 above, wherein the cationically polymerizable compound is an oxetane ring-containing compound.

15. The actinic ray curable ink of item 10 above, wherein the cationically polymerizable compound is an oxirane ring-containing compound.

16. The actinic ray curable ink of item 10 above, wherein the ink has a viscosity at 25° C. of from 5 to 500 mPa·s.

17. The actinic ray curable ink of item 10 above, wherein the ink further contains at least one selected from the group consisting of polyesters, polyurethanes, vinyl resins, acryl resins, rubber resins, and waxes.

18. The actinic ray curable ink of item 10 above, wherein the content of the compound represented by formula 1 is from 0.01 to 20% by weight, the content of the cationically polymerizable compound is from 5 to 95% by weight, the content of the onium salt is from 0.2 to 20% by weight, and the content of the pigment is from 3 to 50% by weight.

19. An image formation process comprising the step of printing an ink image on a recording sheet comprising fibers employing the actinic ray curable ink of item 10 above.

The present invention will be explained in detail below.

As the onium salt used in the invention, there are arylsulfonium salts (for example, CYPACURE UVI-6990 and CYRACURE UVI-6974, each produced by Union Carbide Corp., or Adekaoptomer SP-150, Adekaoptomer SP-152 and Adekaoptomer SP-170, each produced by Asahi Denka Industry Co., Ltd.); aryliodonium salts (for example, RP-2074 produced by Rohdia Corp.); arene-ion complex derivatives (for example, IRGACURE 261, manufactured by Ciba-Geigy Corp.); and diazonium salts. These onium salts may be used alone or in combination.

The onium salt content in the actinic ray curable composition or ink of the invention is preferably from 0.2 to 20' by weight, and more preferably from 1 to 10' by weight.

In the invention, a sulfonium salt represented by formula 2, 3, 4, or 5, each releasing no benzene on exposure of an actinic ray, is suitably used.

Herein, "a sulfonium salt releasing no benzene on exposure of an actinic ray" refers to a sulfonium salt which does not substantially release benzene on exposure of an actinic ray, and particularly a sulfonium salt such that when a 15 μm thick image with an area of 100 m² is formed employing an actinic ray curable composition containing the sulfonium salt in an amount of 5% by weight, and the resulting image is sufficiently exposed at 30° C. to actinic rays so as to completely decompose the sulfonium salt, a releasing amount of benzene is not more than 5 μg or zero.

A sulfonium salt, which has a substituent on the benzene ring bonding the $^+$S in the molecule, satisfies the above-mentioned definition. The sulfonium salt is preferably a sulfonium salt represented by formula 2, 3, 4 or 5.

Formula 2

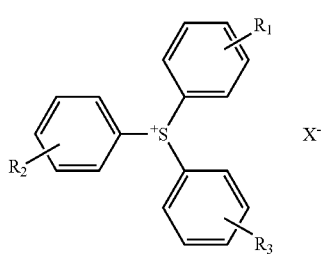

Formula 3

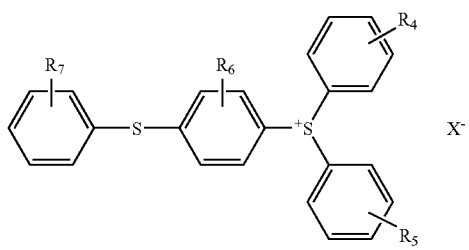

Formula 4

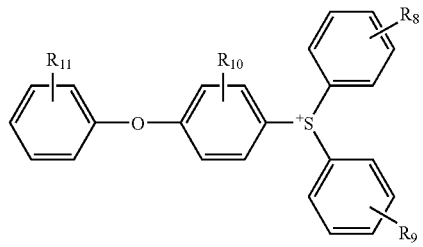

Formula 5

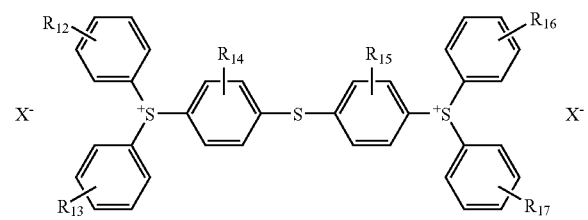

In formulae 2 through 5 above, $R_6$, $R_7$, $R_{10}$, $R_{11}$, $R_{14}$, and $R_{15}$ independently represent a hydrogen atom or a substituent; and $R_1$ through $R_3$, $R_4$, $R_5$, $R_8$, $R_9$, $R_{12}$, $R_{13}$, $R_{16}$, and $R_{17}$ represent a substituent; and $X^-$ represents an anion.

Examples of the substituent represented by $R_1$ through $R_{17}$ include an alkyl group such as a methyl group, an ethyl group, a propyl group, an isopropyl group, a butyl group, an isobutyl group, a t-butyl group, a pentyl group, or a hexyl group; an alkoxy group such as a methoxy group, an ethoxy group, a propoxy group, an isopropyl group, a butoxy group, a hexyloxy group, a decyloxy group or a dodecyloxy group; an acyloxy group such as an acetoxy group, a propionyloxy group, a decylcarbonyloxy group, a dodecylcarbonyloxy group or a benzoyloxy group; an alkoxycarbonyl group such as a methoxycarbonyl group or an ethoxycarbonyl group; a phenylthio group; a halogen atom such as fluorine, chlorine, bromine or iodine; a cyano group; a nitro group; and a hydroxyl group.

$X^-$ represents an anion. Examples thereof include a halogen ion such as $F^-$, $Cl^-$, $Br^-$ or $I^-$, $B(C_6F_5)_4^-$, $R_{18}COO^-$, $R_{19}SO_3^-$, $SbF_6^-$, $AsF_6^-$, $PF_6^-$, and $BF_4^-$, in which $R_{18}$ and $R_{19}$ independently represent an alkyl group such as a methyl group, an ethyl group, a propyl group or a butyl group; an alkyl group having, as a substituent, a halogen atom such as fluorine, chlorine, bromine or iodine, a nitro group, a cyano group, a methoxy group or an ethoxy group; or a phenyl group. Among these, $B(C_6F_5)_4^-$ and $PF_6^-$ are preferred in view of safety.

The above sulfonium salts can be easily synthesized according to commonly known methods, for example, in the same manner as the photolytically acid generating agent described in "THE CHEMICAL SOCIETY OF JAPAN", Vol. 71, No. 11 (1998), and "Imejinguyou Yukizairyo", edited by Yuki Erekutoronikus Zairyokenkyukai, and published by Bunshin Shuppan (1993).

In the invention, the sulfonium salts represented by formulae 2 through 5 above are preferably Exemplified compounds 6 through 14 listed below. In the Exemplified compounds 6 through 14, $X^-$ represents an anion, and examples thereof are the same as those denoted in $X^-$ of formulae 2 through 5 above.

Exemplified compound 6

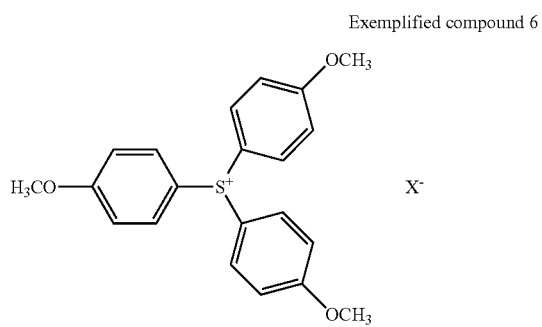

Exemplified compound 7

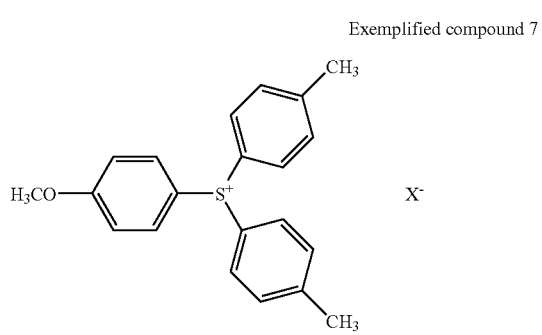

Exemplified compound 8

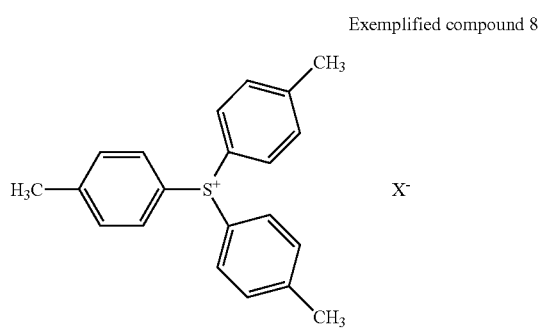

Exemplified compound 9

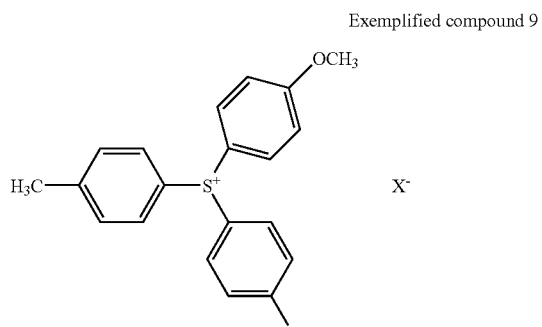

Exemplified compound 10

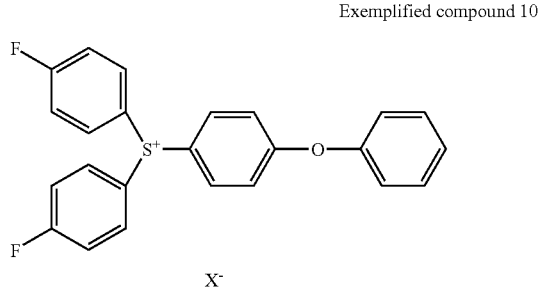

Exemplified compound 11

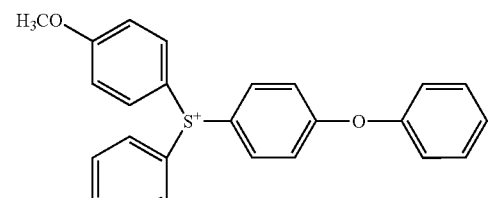

Exemplified compound 12

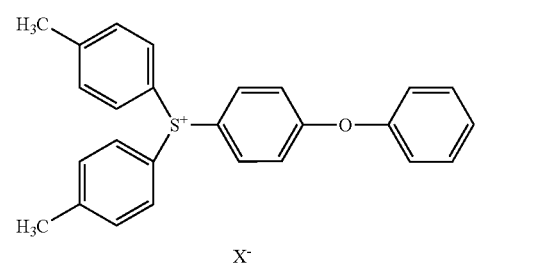

Exemplified compound 13

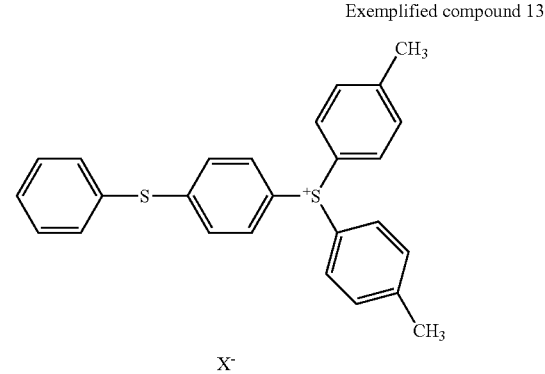

Exemplified compound 14

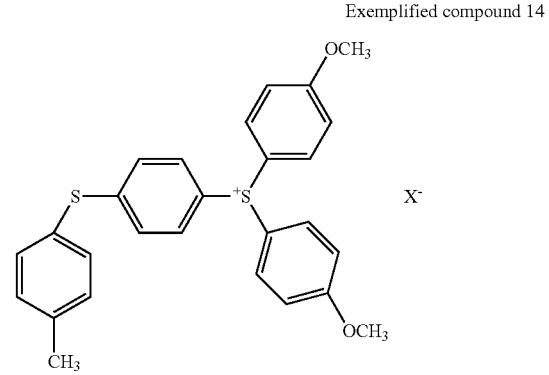

In Formula 1 above, $R^1$ represents a condensed ring group; $R^2$ and $R^3$ independently represent a hydrogen atom, a substituted or unsubstituted alkyl group, a substituted or unsubstituted aryl group or a substituted or unsubstituted aralkyl group; m represents an integer of from 2 to 4; and n represents an integer of from 1 to 10.

The condensed ring of the condensed ring group represented by $R^1$ is a condensed hydrocarbon ring or a condensed heterocyclic ring. Examples thereof include an anthracene ring, a fluorene ring, a pyrene ring, a chrysene ring, a phenanthrene ring, an anthraquinone ring, a perylene ring, a carbazole ring, a phenothiazine ring, a thioxanthone ring, a thianthrene ring, a benzanthracene ring, a naphthacene ring, and a triphenylene ring. Examples of the substituted or unsubstituted alkyl group represented by $R^2$ and $R^3$ include a methyl group, an ethyl group and a carboxymethyl group. Examples of the substituted or unsubstituted aryl group represented by $R^2$ and $R^3$ include a phenyl group and a hydroxy phenyl group. Examples of the substituted or unsubstituted aralkyl group represented by $R^2$ and $R^3$ include a benzyl group, a phenethyl group and a hydroxy benzyl group.

Examples of a compound represented by formula 1 above include the following compounds:

Anthracene derivatives such as 1-(2-hydroxyethyl)anthracene, 1-(4-hydroxy-n-butyl)anthracene, 2-(2-hydroxyethyl)anthracene, 2-(4-hydroxy-n-butyl)anthracene, 9-(2-hydroxyethyl)anthracene, 9-(4-hydroxy-n-butyl)anthracene, 9,10-di(2-hydroxyethyl)anthracene, 9,10-di(4-hydroxy-n-butyl)anthracene, 1,4-di(2-hydroxyethyl)anthracene, 1,5-di(2-hydroxyethyl)anthracene, 1,6-di(2-hydroxyethyl)anthracene, 1,7-di(2-hydroxyethyl)anthracene, 1,8-di(2-hydroxyethyl)anthracene, 1,9-di(2-hydroxyethyl)anthracene, 1,10-di(2-hydroxyethyl)anthracene, 2,3-di(2-hydroxyethyl)anthracene, 2,4-di(2-hydroxyethyl)anthracene, 2,5-di(2-hydroxyethyl)anthracene, 2,6-di(2-hydroxyethyl)anthracene, 2,7-di(2-hydroxyethyl)anthracene, 2,8-di(2-hydroxyethyl)anthracene, 2,9-di(2-hydroxyethyl)anthracene, 2,10-di(2-hydroxyethyl)anthracene, 4,9,10-tri(2-hydroxyethyl)anthracene, 8,9,10-tri(2-hydroxyethyl)anthracene, and 9-(2-hydroxy-1-phenylethyl)anthracene.

Fluorene derivatives such as 1-(2-hydroxyethyl)fluorene, 2-(2-hydroxyethyl)fluorene, 2-(4-hydroxy-n-butyl)fluorene, 3-(2-hydroxyethyl)fluorene, 4-(2-hydroxyethyl)fluorene, 9-(2-hydroxyethyl)fluorene, 9-(4-hydroxy-n-butyl)fluorene, 1,2-di(2-hydroxyethyl)fluorene, 1,3-di(2-hydroxyethyl)fluorene, 1,4-di(2-hydroxyethyl)fluorene, 2,3-di(2-hydroxyethyl)fluorene, 1,9-di(2-hydroxyethyl)fluorene, 2,9-di(2-hydroxyethyl)fluorene, 3,9-di(2-hydroxyethyl)fluorene, 4,9-di(2-hydroxyethyl)fluorene, and 2-(2-hydroxy-1-phenylethyl)fluorene.

Pyrene derivatives such as 1-(2-hydroxyethyl)pyrene, 1-(4-hydroxy-n-butyl)pyrene, 2-(2-hydroxyethyl)pyrene, 4-(2-hydroxyethyl)pyrene, 1,4-di(2-hydroxyethyl)pyrene, and 1-(2-hydroxy-1-phenylethyl)pyrene.

Chrysene derivatives such as 1-(2-hydroxyethyl)chrysene, 2-(2-hydroxyethyl)chrysene, 3-(2-hydroxyethyl)chrysene, 4-(2-hydroxyethyl)chrysene, 5-(2-hydroxyethyl)chrysene, 1,2-di(2-hydroxyethyl)chrysene, 1,3-di(2-hydroxyethyl)chrysene, 1,4-di(2-hydroxyethyl)chrysene, 1,5-di(2-hydroxyethyl)chrysene, 1,6-di(2-hydroxyethyl)chrysene, 1,7-di(2-hydroxyethyl)chrysene, 1,8-di(2-hydroxyethyl)chrysene, 1,9-di(2-hydroxyethyl)chrysene, 1,10-di(2-hydroxyethyl)chrysene, 1,11-di(2-hydroxyethyl)chrysene, 1,12-di(2-hydroxyethyl)chrysene, 2,3-di(2-hydroxyethyl)chrysene, 2,4-di(2-hydroxyethyl)chrysene, 2,5-di(2-hydroxyethyl)chrysene, 2,6-di(2-hydroxyethyl)chrysene, 2,7-di(2-hydroxyethyl)chrysene, 2,8-di(2-hydroxyethyl)chrysene, 2,9-di(2-hydroxyethyl)chrysene, 2,10-di(2-hydroxyethyl)chrysene, 2,11-di(2-hydroxyethyl)chrysene, 2,12-di(2-hydroxyethyl)chrysene, 3,4-di(2-hydroxyethyl)chrysene, 3,5-di(2-hydroxyethyl)chrysene, 3,6-di(2-hydroxyethyl)chrysene, 3,7-di(2-hydroxyethyl)chrysene, 3,8-di(2-hydroxyethyl)chrysene, 3,9-di(2-hydroxyethyl)chrysene, 3,10-di(2-hydroxyethyl)chrysene, 3,11-di(2-hydroxyethyl)chrysene, 3,12-di(2-hydroxyethyl)chrysene, 4,5-di(2-hydroxyethyl)chrysene, 4,6-di(2-hydroxyethyl)chrysene, 4,7-di(2-hydroxyethyl)chrysene, 4,8-di(2-hydroxyethyl)chrysene, 4,9-di(2-hydroxyethyl)chrysene, 4,10-di(2-hydroxyethyl)chrysene, 4,11-di(2-hydroxyethyl)chrysene, 4,12-di(2-hydroxyethyl)chrysene, 5,6-di(2-hydroxyethyl)chrysene, 5,7-di(2-hydroxyethyl)chrysene, 5,8-di(2-hydroxyethyl)chrysene, 5,9-di(2-hydroxyethyl)chrysene, 5,10-di(2-hydroxyethyl)chrysene, 5,11-di(2-hydroxyethyl)chrysene, 5,12-di(2-hydroxyethyl)chrysene, 6,7-di(2-hydroxyethyl)chrysene, 6,8-di(2-hydroxyethyl)chrysene, 6,9-di(2-hydroxyethyl)chrysene, 6,10-di(2-hydroxyethyl)chrysene, 6,11-di(2-hydroxyethyl)chrysene, 6,12-di(2-hydroxyethyl)chrysene, and 2-(2-hydroxy-1-phenylethyl)chrysene.

Phenanthrene derivatives such as 1-(2-hydroxyethyl)phenanthrene, 2-(2-hydroxyethyl)phenanthrene, 3-(2-hydroxyethyl)phenanthrene, 4-(2-(hydroxyethyl)phenanthrene, 9-(2-hydroxyethyl)phenanthrene, 1,2-di(2-hydroxyethyl)phenanthrene, 1,3-di(2-hydroxyethyl)phenanthrene, 1,4-di(2-hydroxyethyl)phenanthrene, 1,5-di(2-hydroxyethyl)phenanthrene, 1,6-di(2-hydroxyethyl)phenanthrene, 1,7-di(2-hydroxyethyl)phenanthrene, 1,8-di(2-hydroxyethyl)phenanthrene, 1,9-di(2-hydroxyethyl)phenanthrene, 1,10-di(2-hydroxyethyl)phenanthrene, 2,3-di(2-hydroxyethyl)phenanthrene, 2,4-di(2-hydroxyethyl)phenanthrene, 2,5-di(2-hydroxyethyl)phenanthrene, 2,6-di(2-hydroxyethyl)phenanthrene, 2,7-di(2-hydroxyethyl)phenanthrene, 2,8-di(2-hydroxyethyl)phenanthrene, 2,9-di(2-hydroxyethyl)phenanthrene, 2,10-di(2-hydroxyethyl)phenanthrene, 3,4-di(2-hydroxyethyl)phenanthrene, 3,5-di(2-hydroxyethyl)phenanthrene, 3,6-di(2-hydroxyethyl)phenanthrene, 3,7-di(2-hydroxyethyl)phenanthrene, 3,8-di(2-hydroxyethyl)phenanthrene, 3,9-di(2-hydroxyethyl)phenanthrene, 3,10-di(2-hydroxyethyl)phenanthrene, 4,5-di(2-hydroxyethyl)phenanthrene, 4,6-di(2-hydroxyethyl)phenanthrene, 4,7-di(2-hydroxyethyl)phenanthrene, 4,8-di(2-hydroxyethyl)phenanthrene, 4,9-di(2-hydroxyethyl)phenanthrene, 4,10-di(2-hydroxyethyl)phenanthrene, and 2-(2-hydroxy-1-phenylethyl)phenanthrene.

Anthraquinone derivatives such as 1-(2-hydroxyethyl)anthraquinone, 2-(2-hydroxyethyl)anthraquinone, 3-(2-hydroxyethyl)anthraquinone, 1,2-di(2-hydroxyethyl)-anthraquinone, 1,3-di(2-hydroxyethyl)anthraquinone, 1,4-di(2-hydroxyethyl)anthraquinone, 1,5-di(2-hydroxyethyl)-anthraquinone, 1,6-di(2-hydroxyethyl)anthraquinone, 1,7-di(2-hydroxyethyl)anthraquinone, 1,8-di(2-hydroxyethyl)-anthraquinone, 2,3-di(2-hydroxyethyl)anthraquinone, 2,4-di(2-hydroxyethyl)anthraquinone, 2,5-di(2-hydroxyethyl)-anthraquinone, 2,6-di(2-hydroxyethyl)anthraquinone, 2,7-di(2-hydroxyethyl)anthraquinone, 2,8-di(2-hydroxyethyl)-anthraquinone, and 2-(2-hydroxy-1-phenylethyl)anthraquinone.

Perylene derivatives such as 1-(2-hydroxyethyl)perylene, 2-(2-hydroxyethyl)perylene, 3-(2-hydroxyethyl)perylene, 1,2-di(2-hydroxyethyl)perylene, 1,3-di(2-hydroxyethyl)perylene, 1,4-di(2-hydroxyethyl)perylene, 1,5-di(2-hydroxyethyl)perylene, 1,6-di(2-hydroxyethyl)perylene, 1,7-di(2-hydroxyethyl)perylene, 1,8-di(2-hydroxyethyl)perylene, 1,9-di(2-hydroxyethyl)perylene, 1,10-di(2-hydroxyethyl)perylene, 1,11-di(2-hydroxyethyl)perylene, 1,12-di(2-hydroxyethyl)perylene, 2,3-di(2-hydroxyethyl)perylene, 2,4-di(2-hydroxyethyl)perylene, 2,5-di(2-hydroxyethyl)perylene, 2,6-di(2-hydroxyethyl)perylene, 2,7-di(2-hydroxyethyl)perylene, 2,8-di(2-hydroxyethyl)perylene, 2,9-di(2-hydroxyethyl)perylene, 2,10-di(2-hydroxyethyl)perylene, 2,11-di(2-hydroxyethyl)perylene, 2,12-di(2-hydroxyethyl)perylene, 3,4-di(2-hydroxyethyl)perylene, 3,5-di(2-hydroxyethyl)perylene, 3,6-di(2-hydroxyethyl)perylene, 3,7-di(2-hydroxyethyl)perylene, 3,8-di(2-hydroxyethyl)perylene, 3,9-di(2-hydroxyethyl)perylene, 3,10-di(2-hydroxyethyl)

perylene, 3,11-di(2-hydroxyethyl)perylene, 3,12-di(2-hydroxyethyl)perylene, and 2,5,8,11-tetra(2-hydroxyethyl)perylene.

Carbazole derivatives such as 1-(2-hydroxyethyl)carbazole, 2-(2-hydroxyethyl)carbazole, 2-(2-hydroxyethyl)-9-methylcarbazole, 3-(2-hydroxyethyl)carbazole, 4-(2-hydroxyethyl)carbazole, 9-(2-hydroxyethyl)carbazole, 1,2-di(2-hydroxyethyl)carbazole, 1,3-di(2-hydroxyethyl)carbazole, 1,4-di(2-hydroxyethyl)carbazole, 1,5-di(2-hydroxyethyl)carbazole, 1,6-di(2-hydroxyethyl)carbazole, 1,7-di(2-hydroxyethyl)carbazole, 1,8-di(2-hydroxyethyl)carbazole, 1,9-di(2-hydroxyethyl)carbazole, 2,3-di(2-hydroxyethyl)carbazole, 2,4-di(2-hydroxyethyl)carbazole, 2,5-di(2-hydroxyethyl)carbazole, 2,6-di(2-hydroxyethyl)carbazole, 2,7-di(2-hydroxyethyl)carbazole, 2,8-di(2-hydroxyethyl)carbazole, 2,9-di(2-hydroxyethyl)carbazole, 3,4-di(2-hydroxyethyl)carbazole, 3,5-di(2-hydroxyethyl)carbazole, 3,6-di(2-hydroxyethyl)carbazole, 3,7-di(2-hydroxyethyl)carbazole, 3,8-di(2-hydroxyethyl)carbazole, 3,9-di(2-hydroxyethyl)carbazole, 4,5-di(2-hydroxyethyl)carbazole, 4,6-di(2-hydroxyethyl)carbazole, 4,7-di(2-hydroxyethyl)carbazole, 4,8-di(2-hydroxyethyl)carbazole, 4,9-di(2-hydroxyethyl)carbazole, 1,2,9-tri(2-hydroxyethyl)carbazole, 1,3,9-tri(2-hydroxyethyl)carbazole, 1,4,9-tri(2-hydroxyethyl)carbazole, 2-hydroxyphenylethylcarbazole, and 9-(2-hydroxy-1-phenylethyl)carbazole.

Phenothiazine derivatives such as 1-(2-hydroxyethyl)phenothiazine, 2-(2-hydroxyethyl)phenothiazine, 3-(2-hydroxyethyl)phenothiazine, 4-(2-hydroxyethyl)phenothiazine, 1-(4-hydroxy-n-butyl)phenothiazine, 2-(4-hydroxy-n-butyl)phenothiazine, 3-(4-hydroxy-n-butyl)phenothiazine, 4-(4-hydroxy-n-butyl)phenothiazine, 1,3-di(2-hydroxyethyl)phenothiazine, 1,4-di(2-hydroxyethyl)phenothiazine, 1,5-di(2-hydroxyethyl)phenothiazine, 2,8-di(2-hydroxyethyl)phenothiazine, 4,8-di(2-hydroxyethyl)phenothiazine, 1,3-di(4-hydroxy-n-butyl)phenothiazine, 1,4-di(4-hydroxy-n-butyl)phenothiazine, 1,5-di(4-hydroxy-n-butyl)phenothiazine, 2,8-di(4-hydroxy-n-butyl)phenothiazine, and 4,8-di(4-hydroxy-n-butyl)phenothiazine.

Thioxanthone derivatives such as 1-(2-hydroxyethyl)thioxanthone, 2-(2-hydroxyethyl)thioxanthone, 3-(2-hydroxyethyl)thioxanthone, 4-(2-hydroxyethyl)thioxanthone, 1,2-di(2-hydroxyethyl)thioxanthone, 1,3-di(2-hydroxyethyl)thioxanthone, 1,4-di(2-hydroxyethyl)-thioxanthone, 1,5-di(2-hydroxyethyl)thioxanthone, 1,6-di(2-hydroxyethyl)thioxanthone, 1,7-di(2-hydroxyethyl)-thioxanthone, 1,8-di(2-hydroxyethyl)thioxanthone, 2,3-di(2-hydroxyethyl)thioxanthone, 2,4-di(2-hydroxyethyl)-thioxanthone, 2,5-di(2-hydroxyethyl)thioxanthone, 2,6-di(2-hydroxyethyl)thioxanthone, 2,7-di(2-hydroxyethyl)-thioxanthone, 2,8-di(2-hydroxyethyl)thioxanthone, 3,4-di(2-hydroxyethyl)thioxanthone, 3,5-di(2-hydroxyethyl)-thioxanthone, 3,6-di(2-hydroxyethyl)thioxanthone, 3,7-di(2-hydroxyethyl)thioxanthone, 3,8-di(2-hydroxyethyl)-thioxanthone, 4,5-di(2-hydroxyethyl)thioxanthone, 4,6-di(2-hydroxyethyl)thioxanthone, 4,7-di(2-hydroxyethyl)-thioxanthone, and 4,8-di(2-hydroxyethyl)thioxanthone.

Thianthrene derivatives such as 1-(2-hydroxyethyl)thianthrene, 2-(2-hydroxyethyl)thianthrene, 3-(2-hydroxyethyl)thianthrene, 4-(2-hydroxyethyl)thianthrene, 1,2-di(2-hydroxyethyl)thianthrene, 1,3-di(2-hydroxyethyl)thianthrene, 1,4-di(2-hydroxyethyl)thianthrene, 1,5-di(2-hydroxyethyl)thianthrene, 1,6-di(2-hydroxyethyl)thianthrene, 1,7-di(2-hydroxyethyl)thianthrene, 1,8-di(2-hydroxyethyl)thianthrene, 2,3-di(2-hydroxyethyl)thianthrene, 2,4-di(2-hydroxyethyl)thianthrene, 2,5-di(2-hydroxyethyl)thianthrene, 2,6-di(2-hydroxyethyl)thianthrene, 2,7-di(2-hydroxyethyl)thianthrene, 2,8-di(2-hydroxyethyl)thianthrene, 3,4-di(2-hydroxyethyl)thianthrene, 3,5-di(2-hydroxyethyl)thianthrene, 3,6-di(2-hydroxyethyl)thianthrene, 3,7-di(2-hydroxyethyl)thianthrene, 3,8-di(2-hydroxyethyl)thianthrene, 4,5-di(2-hydroxyethyl)thianthrene, 4,6-di(2-hydroxyethyl)thianthrene, 4,7-di(2-hydroxyethyl)thianthrene, and 4,8-di(2-hydroxyethyl)thianthrene, 1,3,5-tri(2-hydroxyethyl)thianthrene, and 2-(2-hydroxy-1-phenylethyl)thianthrene.

Benzanthracene derivatives such as 2-(2-hydroxyethyl)benzanthracene, 2-(4-hydroxy-n-butyl)benzanthracene, 3-(2-hydroxyethyl)benzanthracene, 4-(2-hydroxyethyl)-benzanthracene, 6-(2-hydroxyethyl)benzanthracene, 7-(2-hydroxyethyl)benzanthracene, 8-(2-hydroxyethyl)-benzanthracene, 9-(2-hydroxyethyl)benzanthracene, 9-(2-hydroxyethyl)anthracene, 9-(4-hydroxy-n-butyl)benzanthracene, 10-(2-hydroxyethyl)benzanthracene, 11-(2-hydroxyethyl)-benzanthracene, 2,6-di(2-hydroxyethyl)benzanthracene, 2,8-di(2-hydroxyethyl)benzanthracene, and 2,10-di(2-hydroxyethyl)benzanthracene.

Naphthacene derivatives such as 1-(2-hydroxyethyl)naphthacene, 1-(4-hydroxy-n-butyl)naphthacene, 2-(2-hydroxyethyl)naphthacene, 2-(4-hydroxy-n-butyl)naphthacene, 4-(2-hydroxyethyl)naphthacene, 4-(4-hydroxy-n-butyl)naphthacene, 5-(2-hydroxyethyl)naphthacene, 5-(4-hydroxy-n-butyl)naphthacene, 9-(2-hydroxyethyl)naphthacene, 9-(4-hydroxy-n-butyl)naphthacene, 1,4-di(2-hydroxyethyl)naphthacene, 1,11-di(2-hydroxyethyl)naphthacene, and 1,11-di(4-hydroxy-n-butyl)naphthacene.

Triphenylene derivatives such as 2-(2-hydroxyethyl)triphenylene, 2-(4-hydroxy-n-butyl)triphenylene, 3-(2-hydroxyethyl)triphenylene, 3-(4-hydroxy-n-butyl)triphenylene, 4-(2-hydroxyethyl)triphenylene, and 4-(4-hydroxy-n-butyl)triphenylene.

The compounds described above can be synthesized according to methods described in the following literatures: Buhoy, N. P. and Long, D. A. "Rec. Trav. Chim., 1956, 75, 1221; Backlly, D. A. and Thomas, H.R., "Ger. Offen., 1975; DE2,56,538; DE19,750,710, U.S. patent application Ser. No. 73-428,929; Chem. Abstr. 1975, 83, p192946w; and Japanese Patent Publication No. 2005-20728.

The content of the compound represented by formula 1 in the actinic ray curable composition or ink of the invention is from 0.01 to 20% by weight, and more preferably from 0.1 to 5% by weight.

As the cationically polymerizable compound used in the invention, there are, for example, an oxetane ring-containing compound (hereinafter referred to as oxetane compound) and an oxirane ring-containing compound (hereinafter referred to as oxirane compound). The content of the cationically polymerizable compound in the actinic ray curable composition or ink of the invention is preferably from 5 to 95% by weight, and more preferably from 20 to 80% by weight.

The oxetane compound is a compound having one or more oxetane rings in the molecule. Typical examples of the oxetane compound include 3-ethyl-3-hydroxymethyloxetane (OXT101, etc.), 1,4-bis [(3-ethyl-3-oxetanyl)-methoxymethyl]benzene (OXT 121 etc.), 3-ethyl-3-(phenoxymethyl) oxetane (OXT 211 etc.), di(1-ethyl-3-oxetanyl) methyl ether (OXT 221 etc.), and.), and 3-ethyl-3-(2-ethylhexyloxymethyl)oxetane (OXT 212 etc.), each produced by Toa Gosei Co., Ltd. Especially preferred are 3-ethyl-3-hydroxymethyloxetane, 3-ethyl-3-(phenoxymethyl)oxetane and di(1-ethyl-3-oxetanyl) methyl ether. These can be used singly or as a mixture of two or more thereof.

The content of the oxetane compound in the actinic ray curable composition or ink of the invention is preferably from 5 to 95% by weight, and more preferably from 20 to 80% by weight.

Examples of the oxirane compound include epoxides as described below such as an aromatic epoxide, an alicyclic epoxide and an aliphatic epoxide.

The aromatic epoxide is preferably a di- or poly-glycidyl ether manufactured by reaction of polyhydric phenol having at least one aromatic ring or an alkylene oxide adduct thereof with epichlorohydrin. Examples thereof include a di- or poly-glycidyl ether of bisphenol A or of an alkylene oxide adduct thereof, a di- or poly-glycidyl ether of hydrogenated bisphenol A or of an alkylene oxide adduct thereof, and a novolac type epoxy resin. Herein, as the alkylene oxide, there are, for example, ethylene oxide and propylene oxide.

The alicyclic epoxide is preferably a compound containing cyclohexene oxide or cyclopentene oxide obtained by epoxydizing a compound having at least one cycloalkane ring such as cyclohexene or cyclopentene by use of a suitable oxidizing agent such as hydrogen peroxide or a peracid.

The aliphatic epoxide is preferably a di- or polyglycidyl ether of aliphatic polyhydric alcohol or of an alkylene oxide adduct thereof. Typical examples thereof include a diglycidyl ether of alkylene glycol such as diglycidyl ether of ethylene glycol, diglycidyl ether of propylene glycol or diglycidyl ether of 1,6-hexane diol; a polyglycidyl ether of polyhydric alcohol such as di- or triglycidyl ether of glycerin or an alkylene oxide adduct thereof; and a diglycidyl ether of polyalkylene glycol such as diglycidyl ether of polyethylene glycol or an alkylene oxide adduct thereof and a diglycidyl ether of polypropylene glycol or an alkylene oxide adduct thereof. Herein, as the alkylene oxide, there are, for example, ethylene oxide and propylene oxide.

Among these epoxides, the aromatic epoxide and alicyclic epoxide are preferred, and the alicyclic epoxide is specifically preferred, taking a quick curing property in consideration.

In the invention, the most preferred alicyclic epoxide is one described in Japanese Patent O.P.I. Publication Nos. 2004-315778 and 2005-28632.

Exemplified compound of the alicyclic epoxide will be listed below.

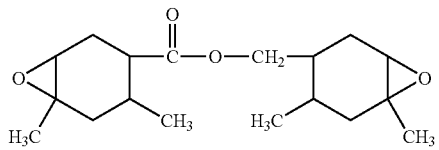

EP-1

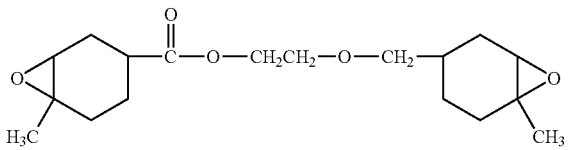

EP-2

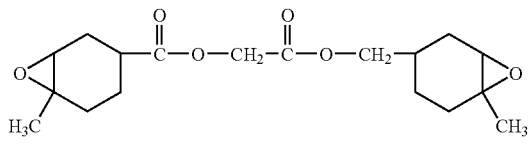

EP-3

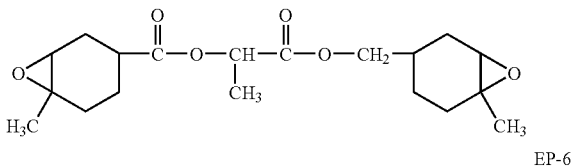

EP-4

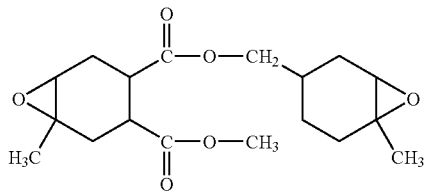

EP-5

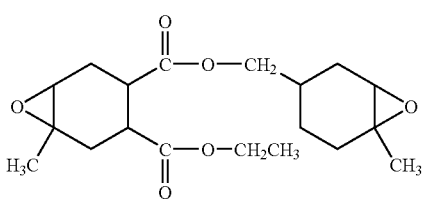

EP-6

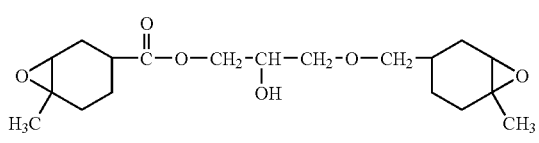

EP-7

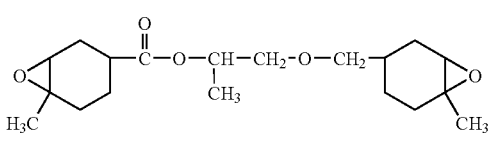

EP-8

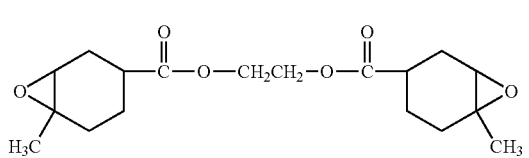

EP-9

EP-10

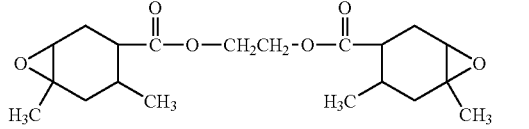

EP-11

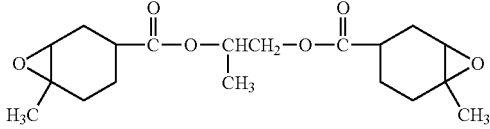

EP-12

-continued
EP-13
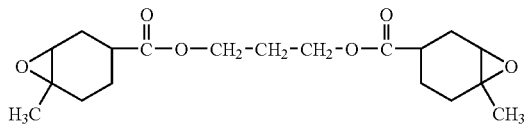
EP-14
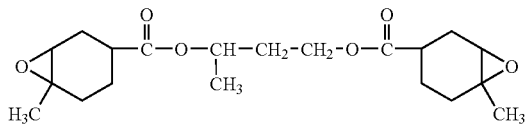
EP-15
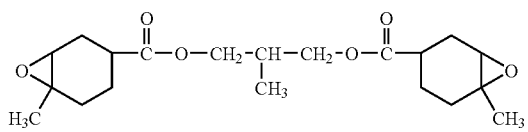
EP-16
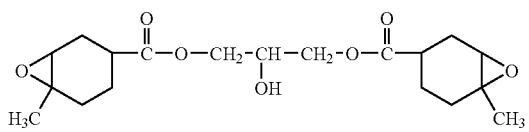
EP-17
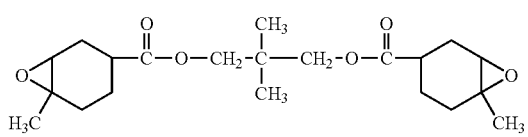
EP-18
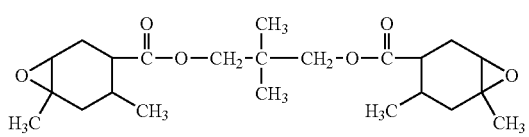
EP-19
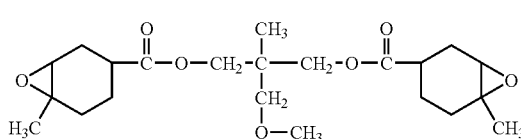
EP-20
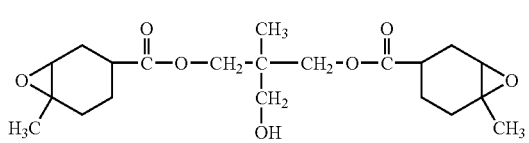
EP-21
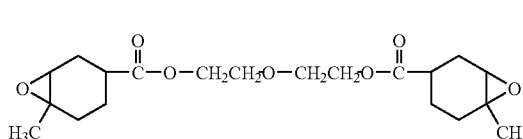
EP-22
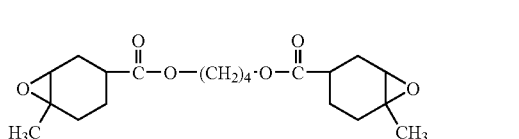
EP-23
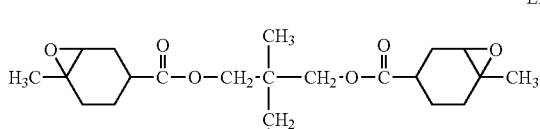
EP-24
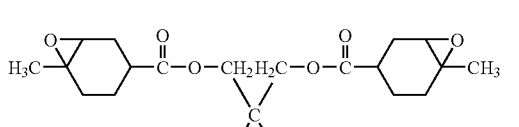
EP-25
EP-26
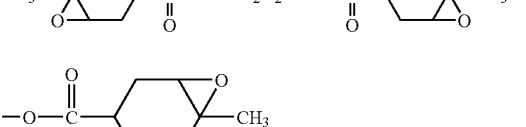
EP-27
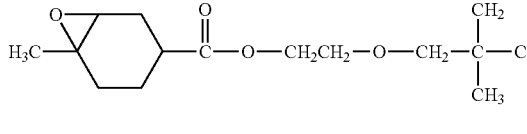
EP-28
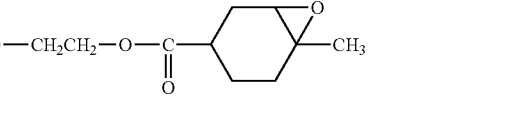

-continued
EP-29
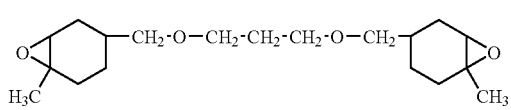
EP-30
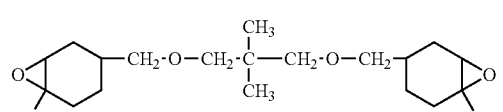
EP-31
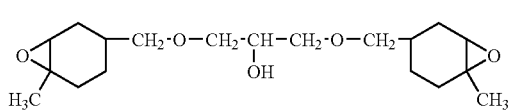
EP-32
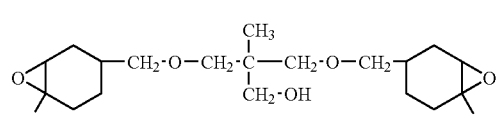
EP-33
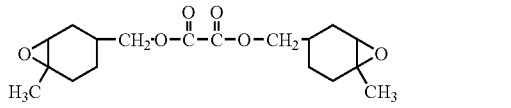
EP-34
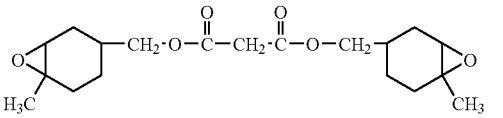
EP-35
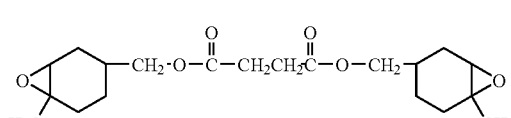
EP-36
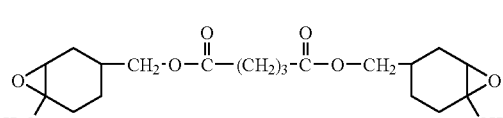
EP-37
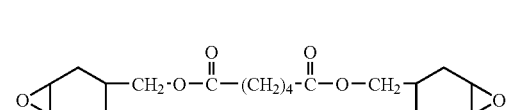
EP-38
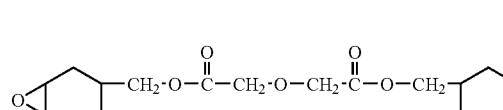
EP-39
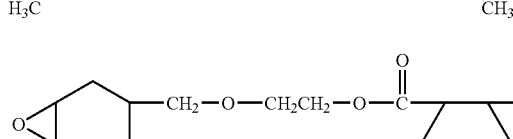
EP-40
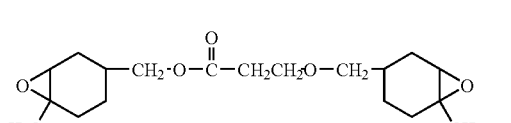
EP-41
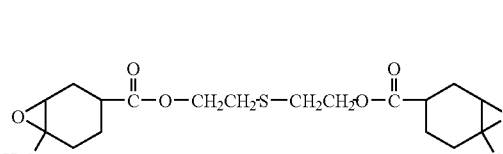
EP-42
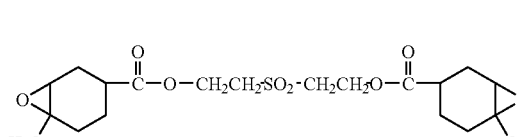
EP-43
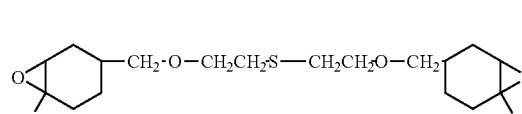
EP-44
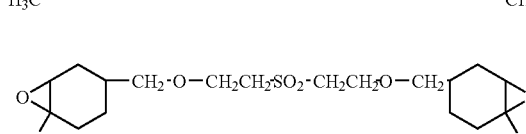
EP-45
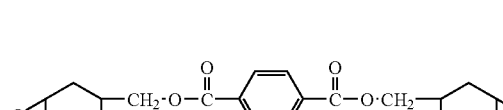
EP-46
EP-47
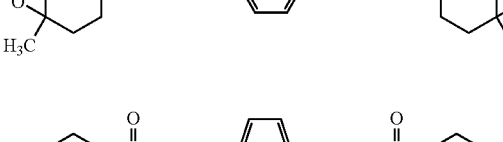
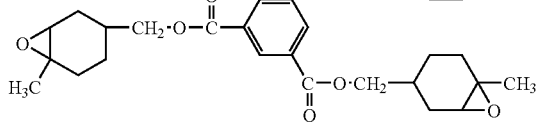
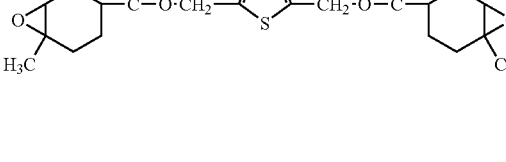

-continued

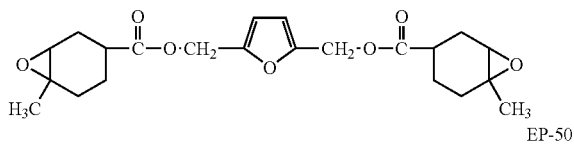
EP-48

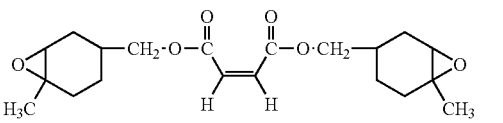
EP-49

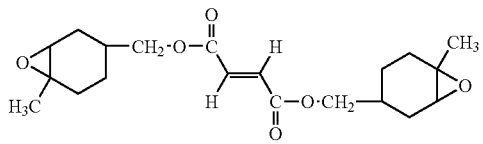
EP-50

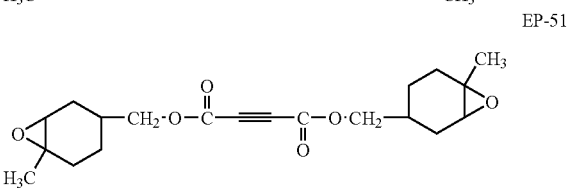
EP-51

In the invention, the oxirane compound may be used singly or as an admixture of two or more kinds thereof.

The content of the oxirane compound in the actinic ray curable composition or ink of the invention is preferably from 5 to 95% by weight, and more preferably from 20 to 80% by weight.

In the invention, a vinyl ether compound can be used in combination as the cationically polymerizable compound. Examples of the vinyl ether compound used in the invention include di- or tri-vinyl ether compounds such as ethylene glycol divinyl ether, diethylene glycol divinyl ether, triethylene glycol divinyl ether, propylene glycol divinyl ether, dipropylene glycol divinyl ether, butane diol divinyl ether, hexane diol divinyl ether, cyclohexane dimethanol divinyl ether, and trimethylol propane trivinyl ether; and mono vinyl ether compounds such as ethylene glycol monovinyl ether, ethyl vinyl ether, n-butyl vinyl ether, iso-butyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether.

The actinic ray curable ink of the invention can contain pigments. As the pigments, there are various pigments such as organic or inorganic pigments. Examples of the pigment include white pigments such as titanium oxide, zinc white, white lead, lithopone and antimony oxide; black pigments such as aniline black, iron black and carbon black; yellow pigments such as chrome yellow, yellow oxide, hansa yellow (100, 50, 30 etc.), titan yellow, benzine yellow and permanent yellow; orange pigments such as chrome vermilion, permanent orange, Vulcan fast orange, and indanthrene brilliant orange; brown pigment such as iron oxide, permanent brown and parabrown; red pigments such as red iron oxide, cadmium red, antimony vermilion, permanent red, rhodamine lake, alizarin lake, thioindigo Red, PV carmine, monolite fast red, and quinacridone; violet pigments such as cobalt violet, manganese violet, fast violet, methyl violet lake, indanthrene brilliant violet, and dioxazine violet; blue pigments such as ultramarine blue, Prussian blue, cobalt blue, alkali blue lake, metal free phthalocyanine blue, copper phthalocyanine blue, indanthrene blue, and indigo; green pigments such as chrome green, zinc green, chromium oxide, emerald green, naphthol green, green gold, acid green lake, malachite green lake, phthalocyanine green, polychlorobromo copper phthalocyanine, and various kinds of fluorescent pigment, metal powder pigment and extender pigment.

The content of the pigments in the actinic ray curable ink of the invention is preferably from 3 to 50% by weight, and more preferably from 5 to 20% by weight, in obtaining sufficient image density or sufficient light fastness.

The composition or ink of the invention optionally contains the following inactive components in an amount of not more than 5% by weight.

The inactive components are a polymeric binder, inorganic fillers, a softening agent, an anti-oxidant, an anti-aging agent, a stabilizer, an adhesion-providing agent, a leveling agent, an anti-foaming agent, a plasticizer, a dyestuff, a processing agent, an organic solvent, a lubricant, and an ultraviolet light-shielding agent. Examples of the polymeric binder include polyesters, polyurethanes, vinyl resins, acryl resins, rubber resins, and waxes. Examples of the inorganic fillers include metal oxides such as zinc oxide, aluminum oxide, antimony oxide, calcium oxide, chromium oxide, tin oxide, titanium oxide, iron oxide, copper oxide, lead oxide, bismuth oxide, magnesium oxide and manganese oxide; hydroxides such as aluminum hydroxide, ferrous hydroxide, and calcium hydroxide; salts such as calcium carbonate and calcium sulfate; a silicon compound such as silicon dioxide; natural pigment such as kaolin, bentonite, clay and talc; minerals such as natural zeolite, ohya stone, natural mica and ammonite; synthetic inorganic substances such as artificial mica and artificial zeolite; and metals such as aluminum, iron and zinc. In these components, there are those overlapping with the pigments described above, however, these can be added to the composition or ink of the invention as additional additives. The lubricant is added in order to increase lubricity of a coating surface, and examples thereof include waxes such as fatty acid ester wax which is ester of polyol and fatty acid, silicon wax, fluorine wax, polyolefin wax, animal wax, and vegetable wax. Examples of the adhesion-providing agent include rosins such as resin acid, polymeric resin acid, and resin acid ester; terpene resin; terpene-phenol resin; aromatic hydrocarbon resin; aliphatic saturated hydrocarbon resin; and petroleum resin.

A method, which the components described above are mixed to obtain the actinic ray curable composition or ink of the invention, is not specifically limited as long as the components are sufficiently mixed. As the mixing method, there are a stirring method employing rotation of a propeller, a kneading method employing kneading rollers, and a dispersion method employing a common disperser such as a sand mill.

As actinic ray used for curing the actinic ray curable composition or ink of the invention, there are ultraviolet ray, electron beam, X-ray, radioactive ray, and high frequency wave. Among these, ultraviolet ray is most preferred in cost saving. As an ultraviolet ray source, there are ultraviolet laser, a mercury lamp, a xenon lamp, a sodium lamp, and an alkali metal lamp. When concentration of rays is necessary, laser rays are especially preferred.

The actinic ray actinic ray curable composition and ink of the invention ink has a viscosity at 25° C. of preferably from 5 to 500 mPa·s, which provides good curability independent of curing circumstances (such as temperature and humidity).

A recording sheet used in the invention is preferably a recording sheet into which the actinic ray curable ink of the invention permeates. Such a recording sheet is comprised of fibers. Typical examples of the fibers include wool fiber, silk fiber, hair, alginate fiber, polyvinyl chloride fiber, polyacrylonitrile fiber, polyester fiber, polyamide fiber, polypropylene fiber, polyurethane fiber and cellulose fiber.

As synthetic fibers, there are polyester fiber, polyamide fiber, polyvinyl alcohol fiber, polyethylene fiber, polypropylene fiber, and polyaramid fiber, each available on the market. As cloth comprised of the synthetic fibers, there are fabric, knitted cloth, and non-woven fabric, each employing the synthetic fibers described above. Tarpaulin is a cloth whose surface is laminated with polyvinyl chloride resin. The lamination can be carried out by a lamination method, a coating method, a padding method, a topping method or a combination thereof. Polyvinyl chloride resin may be of paste resin type or of straight resin type. Polyvinyl chloride resin can contain a plasticizer, fillers, a low-temperature resistant agent, a flame-proofing agent or an ultraviolet absorbing agent.

The fibers as described above may be any of forms generally used in textile industries, i.e., any of the forms of a single fiber, thread, fabric, knitted fabric, or non-woven fabric such as felt.

In the invention, a long length roll (web) of a recording sheet is advantageously utilized in respect to a cost of a recording sheet such as a packaging cost and a manufacturing cost, an efficiency of print preparation and applicability to variety of print sizes.

In the image formation process of the invention, an ink-jet recording method employing actinic ray curable ink-jet ink will be explained.

In the image formation process of the invention, it is preferred that the actinic ray curable ink-jet ink described above be ejected onto a recording sheet according to an ink-jet recording method, and then cured by irradiation of actinic ray such as UV ray.

In the invention, the thickness of an ink layer, after ink has been ejected onto recording sheet and cured by actinic ray irradiation, is preferably from 2 to 20 μm. In an actinic ray curable ink-jet ink recording method in the field of screen printing, the thickness of the ink is at present over 20 μm. Ink ejecting to give an excessive layer thickness is not preferred where a thin film is used as a recording sheet, because problems are caused in that stiffness and texture of printed matter vary, in addition to problems of curl and wrinkles of recording sheet.

Herein, the thickness of ink layer refers to a maximum thickness of the ink layer deposited on recording sheet. This applies to a single color ink layer, and an overlapped layer of two different color (secondary color) inks, three different color inks or four different color inks (including white ink as a base ink), which are formed on recording sheet according to an ink-jet recording process.

As ejection conditions of actinic ray curable ink-jet ink, ejection of the ink is preferably performed while a recording head and the ink being heated at from 35 to 100° C. in respect to ejection stability. Since the actinic ray curable ink-jet ink shows a large viscosity variation width depending on temperature variation and which in turn significantly influences a liquid droplet size and a liquid droplet ejection speed resulting in deterioration of image quality, it is required to keep an ink temperature constant while raising the ink temperature. A control width of ink temperature is a set temperature±5° C., preferably a set temperature±2° C. and furthermore preferably a set temperature±1° C.

The droplet volume of the ink ejected from each ink nozzle is preferably 2 to 15 pl.

The droplet volume of the ink has to be in the range described above to form images with high resolution, however, this droplet volume tends to lower the aforementioned ejection stability. In the invention, even when a small droplet volume such as 2 to 15 pl is ejected, ejection stability is improved, and images with high resolution can be formed.

In an image recording method of the invention, it is preferred that actinic ray is irradiated 0.001 to 2.0 seconds after ink has been ejected on recording sheet, and it is more preferred that actinic ray is irradiated 0.001 to 1.0 second after ink has been ejected on recording sheet. It is specifically important that the irradiation timing be as early as possible in order to form an image with high resolution.

As an actinic ray irradiation method, a basic method is disclosed in JP-A No. 60-132767, in which light sources are provided at the both sides of a head unit where a head and a light are scanned in a shuttle mode. Irradiation is performed in a certain time interval after ink has been ejected onto recording sheet. Further, curing is completed by another light source which is not driven. As a light irradiation method, a method utilizing optical fiber, and a method in which collimated light source is reflected by a mirror provided on the side surface of a head unit and UV light (ultraviolet light) is irradiated on a recording portion are disclosed in U.S. Pat. No. 6,145,979. In the image formation process of the invention, any of these irradiation methods can be utilized.

Further, a method is also a preferable embodiment, in which actinic ray irradiation is divided into two steps; firstly, a first actinic ray irradiation is carried between the period from 0.001 to 2.0 seconds after ink was deposited on recording sheet by the above-described method and further a second actinic ray irradiation is carried after printing has been completed. Shrinkage of recording sheet caused at the time of ink curing can be depressed by dividing actinic ray irradiation into two steps.

Heretofore, in a UV ink-jet method, it has been usual to utilize a light source of high illuminance having a power exceeding 1 kW·hr in order to minimize widening of dots and bleeding-out caused after ink deposition on recording sheet. However, use of the light source makes shrinkage of a recording sheet too large to be used practically at present.

In the invention, an actinic ray having a maximum illuminance in a wavelength range from 300 to 360 nm is preferably used, and even when a light source a power exceeding 1 kW·hr is used, images with high resolution can be formed, and shrinkage of a recording sheet is in the permissible range.

In the invention, the power of light sources irradiating an actinic ray is preferably less than 1 kW·hr. Examples of the light sources having a power of less than 1 kW·hr include a fluorescent lamp, a cold cathode tube and an LED, but are not limited thereto.

An ink-jet recording apparatus (hereinafter also referred to as a recording apparatus) in the invention will be explained.

Next, the recording apparatus in the invention will be explained suitably in reference to a drawing. Herein, the recording apparatus of the drawing is only an embodiment of a recording apparatus of the invention, and a recording apparatus of the invention is not limited to the drawing.

FIG. 1 shows a front view of one embodiment of the main section of an ink-jet recording apparatus in the invention.

Recording apparatus 1 is equipped with head carriage 2, recording head 3, irradiation means 4 and platen portion 5. In recording apparatus 1, platen portion 5 is arranged under recording sheet P. Platen portion 5 has a UV ray absorbing function, and absorbs extra UV ray having passed through recording sheet P. As a result, images with high resolution can be reproduced quite stably.

Recording sheet P is guided by guide member 6 to be moved to the back side from the front side in FIG. 1 by operation of a transport means (not illustrated). Scan of recording heads 3 held in the head carriage 2 is made by reciprocating head carriage 2 in the R direction in FIG. 1 according to a head scanning means (not illustrated).

Head carriage 2 is provided over recording sheet P, and stores recording heads 3 described below with the ink ejection outlets arranged downward. Head carriage 2 is provided in the main body of recording apparatus 1 so as to reciprocate in the R direction shown in FIG. 1 by a drive of a head scanning means.

Herein, FIG. 1 illustrates that head carriage 2 is supposed to store recording heads 3 each containing a white ink composition W, a yellow ink composition Y, a magenta ink composition M, a cyan ink composition C, a black ink composition K, a light yellow ink composition Ly, a light magenta ink composition Lm, a light cyan ink composition Lc, a light black ink composition Lk and a white ink composition W, however, the number of recording heads 3 stored in head carriage 2 in practical operation is suitably determined.

Recording heads 3 eject an actinic ray curable ink (for example, UV curable ink) to be supplied by means of an ink supplying means (not illustrated) from the ink ejection outlets onto the recording sheet P by action of plural ejecting means (not illustrated) equipped in the recording apparatus. The actinic ray curable ink (hereinafter referred to simply as the ink) ejected from recording heads 3 onto the recording sheet P is cured by UV irradiation.

The recording heads 3 eject the ink as ink droplets onto a pre-determined region (a region capable of receiving the ink) of recording sheet P while the scan of the head is made in which the head moves from one edge to another of the recording sheet in the R direction in FIG. 1 by drive of the head scanning means, whereby the ink is deposited on that region of the recording sheet.

The above scan is suitably made several times to eject the ink onto one region of recording sheet. After that, while the recording sheet P is transported from the front side to the back side of the page in FIG. 1 by a transport means and the scan of the recording heads 3 is again made by the head scan means, the ink is ejected from the recording heads onto a region adjacent to the one region of the recording sheet transported to the back side of the page.

The above operation is repeated, whereby the ink is ejected from recording heads 3 employing the head scan means and the transport means to form an image comprised of aggregates of the ink droplets on recording sheet P.

Irradiation means 4 is equipped with a UV lamp which emits ultraviolet ray with a specific wavelength region at a stable exposure energy and a filter which transmits ultraviolet ray with a specific wavelength. Herein, Examples of the UV lamp include a mercury lamp, a metal halide lamp, an excimer laser, a UV laser, a cold cathode tube, a black light, and an LED, and a metal halide lamp tube, a cold cathode tube, a mercury lamp tube and a black light, having a band-shape, are preferable. Specifically a cold cathode tube and a black light which emit a 365 nm ultraviolet ray are preferable, which can prevent bleeding-out, efficiently control a dot diameter, and reduce wrinkles on curing. Utilizing a black light as a radiation source of irradiation means 4 reduces a manufacturing cost of irradiation means 4 for ink curing.

Irradiation means 4 has the possible largest size which can be installed in the recording apparatus 1 (an ink-jet printer) or the irradiation region of the irradiation means 4 is larger than the largest region of recording sheet, onto which ink is ejected by one time scan of recording heads 3 driven by the head scanning means.

The irradiation means 4 is arranged nearly in parallel with recording sheet 4 at the both sides of head carriage 2, and fixed.

In order to adjust illuminance at the ink ejection outlets, the whole of recording heads 3 is light-shielded, however, in addition, it is preferable to make distance h2 between the ink ejection outlet 31 of recording heads 3 and recording sheet P longer than distance h1 between irradiation means 4 and recording sheet P (h1<h2) or to make distance d between recording heads 3 and irradiation means 4 long (to make d large). Further, it is more preferable to provide bellows structure 7 between recording heads 3 and irradiation means 4.

Herein, the wavelength of ultraviolet rays, which are irradiated through irradiation means 4 can be suitably changed by exchange of a UV lamp or a filter, which is installed in irradiation means 4.

The actinic ray curable ink-jet ink of the invention has excellent ejection stability, and when an image is recorded employing a line head type ink-jet recording apparatus, is especially useful.

Figure 2:
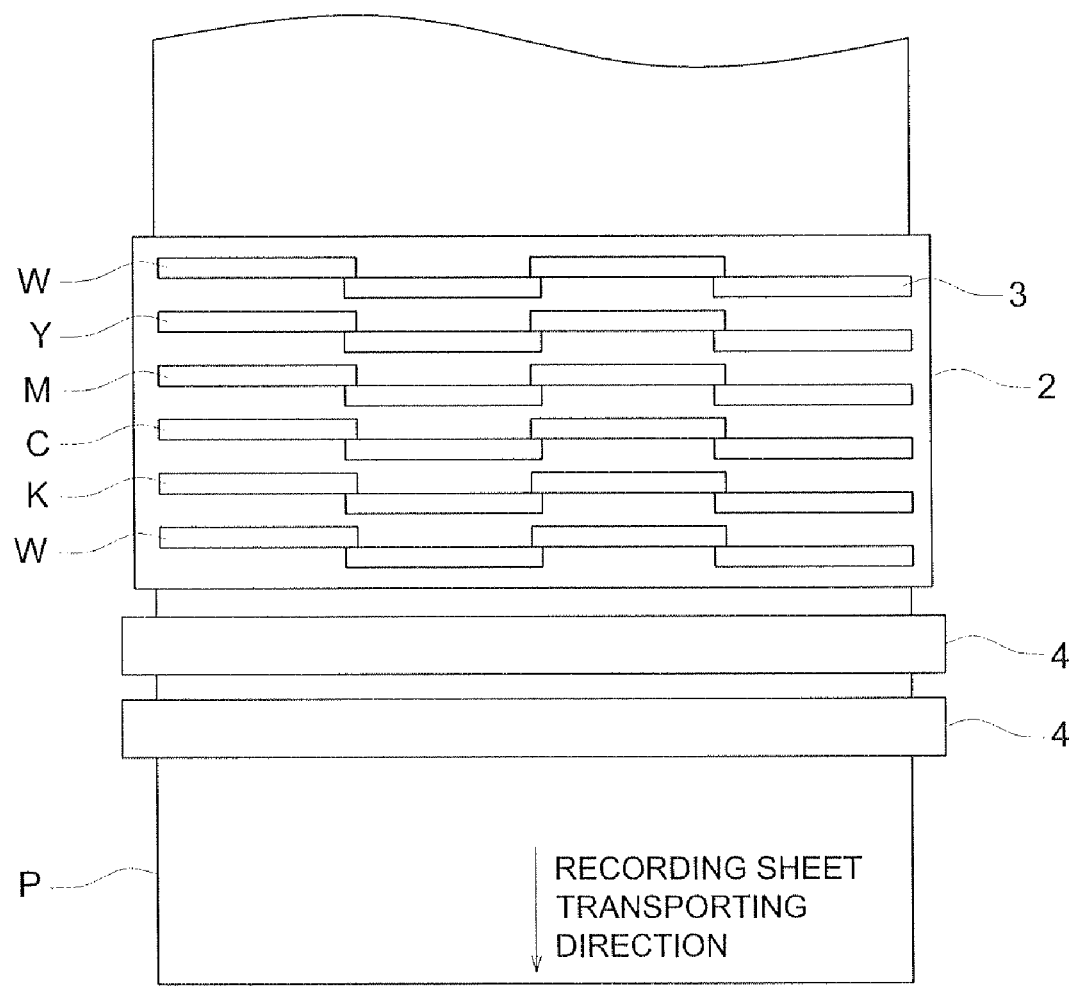
FIG. 2 shows a top view of another embodiment of the main section of an ink-jet recording apparatus.

FIG. 2 shows a top view of another embodiment of the main section of an ink-jet recording apparatus.

The ink-jet recording apparatus in FIG. 2 is called a line head type ink-jet recording apparatus. Recording heads 3 are provided in a head carriage 2 to cover the entire width of recording sheet P. The recording heads 3 each stores a different color ink, a white ink composition W, a yellow ink composition Y, a magenta ink composition M, a cyan ink composition C, a black ink composition K, and a white ink composition W.

Irradiation means 4 is provided just downstream of head carriage 2 to cover the entire width of recording sheet P and the entire printed surface.

In the line head type recording apparatus, head carriage 2 and irradiation means 4 are fixed, and recording sheet P only is transported in the direction as shown in FIG. 2. Ink is ejected onto the recording sheet to be transported and then exposed through the irradiation means to form a cured image on the recording sheet.

EXAMPLES

The invention will be explained employing the following examples, however, the embodiments of the invention are not limited thereto.

Example 1

Preparation of Actinic Ray Curable Flexographic Ink Samples 1 Through 10

Materials as shown in Table 1 were placed in a sand mill, dispersed for 4 hours, and filtered through a membrane filter to obtain actinic ray curable flexographic ink samples 1 through 10. In Table 1, the numerical numbers in the parentheses represent "parts by weight".

TABLE 1

| Flexographic ink sample Nos. | Oxetane compound () | | | Oxirane compound () | Onium salt (**) | *Compound () | Pigment () | Resin (**) | Remarks |
|---|---|---|---|---|---|---|---|---|---|
| 1 | OXT221 (5) | OXT101 (1) | OXT212 (1) | CEL2021P (70) | UVI6692 (10) | A (1) | f) (10) | DA9100 (2) | Inv. |
| 2 | OXT221 (5) | OXT101 (1) | OXT212 (1) | EP-17 (65) | S-1 (5) | B (1) | f) (10) | Polybd605 (12) | Inv. |
| 3 | OXT221 (5) | OXT101 (1) | OXT212 (1) | EP-17 (70) | S-2 (5) | C (1) | f) (10) | DA9100 (2) | Inv. |
| 4 | OXT221 (5) | OXT101 (1) | OXT212 (1) | EP-17 (65) | S-3 (5) | D (1) | f) (10) | Polybd605 (12) | Inv. |
| 5 | OXT221 (5) | OXT101 (1) | OXT212 (1) | EP-17 (65) | I-1 (5) | E (1) | f) (10) | DA9100 (2) | Inv. |
| 6 | OXT221 (5) | OXT101 (1) | OXT212 (1) | CEL2021P (70) | UVI6692 (10) | a) (1) | f) (10) | DA9100 (2) | Comp. |
| 7 | OXT221 (5) | OXT101 (1) | OXT212 (1) | EP-17 (65) | S-1 (5) | b) (1) | f) (10) | Polybd605 (12) | Comp. |
| 8 | OXT221 (5) | OXT101 (1) | OXT212 (1) | EP-17 (70) | S-2 (5) | c) (1) | f) (10) | DA9100 (2) | Comp. |
| 9 | OXT221 (5) | OXT101 (1) | OXT212 (1) | EP-17 (65) | S-3 (5) | d) (1) | f) (10) | Polybd605 (12) | Comp. |
| 10 | OXT221 (5) | OXT101 (1) | OXT212 (1) | EP-17 (65) | I-1 (5) | e) (1) | f) (10) | DA9100 (2) | Comp. |

Inv.: Inventive,
Comp.: Comparative
*Compound: Exemplified compound of formula 1 or comparative compound
(**) Parts by weight.

In Table 1 above, details of the materials used in each ink sample are as follows:

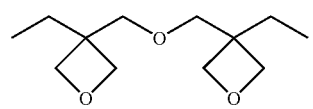

OXT221

(Oxetane compound produced by Toa Gosei Co., Ltd.)

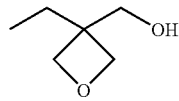

OXT101

(Oxetane compound produced by Toa Gosei Co., Ltd.)

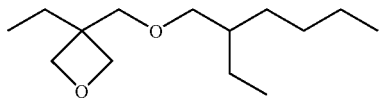

OXT212

(Oxetane compound produced by Toa Gosei Co., Ltd.)

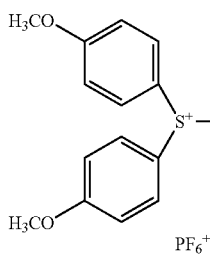

S-1

(Sulfonium salt)

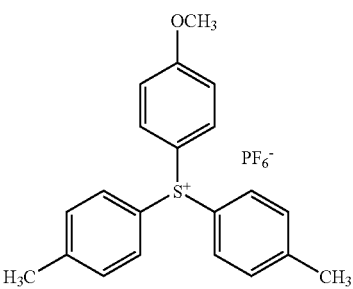

S-2

(Sulfonium salt)

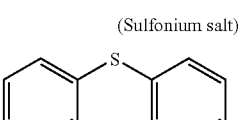

S-3

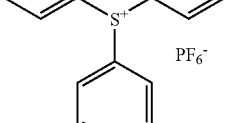

(Sulfonium salt)

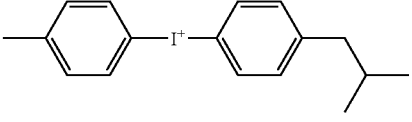

I-1

(Iodonium salt)

UVI6692: Triphenylsulfonium hexafluorophosphate (produced by Union Carbide Corp.)
A: 9-Hydroxyethylanthracene
B: 9-Hydroxyethylfluorene
C: 2-Hydroxyethyl-9-methylcarbazole
D: 2-Hydroxy-n-butylphenothiazine
E: 2-Hydroxyethylthianthrene
a): 9-Hydroxymethylanthracene
b): 9-Hydroxymethylfluorene
c): 2-Hydroxymethyl-9-methylcarbazole
d): 2-Hydroxymethylphenothiazine
e): 2-Hydroxymethylanthrene
f): Pigments as shown in Table 2 described later.
Poly Bd 605: Epoxidized derivative of hydroxyl-terminated (telechelic) polybutadiene produced by Elf Atochem Inc.
DA9100: Thermoplastic modified acryl resin (produced by Sannobuko Co., Ltd.)
Pigments used are shown in Table 2.

TABLE 2

| Pigments used | | | |
|---|---|---|---|
| K | C | M | Y |
| Pigment Black 7 (#52 produced by Mitsui Chemical Co., Ltd.) | Pigment Blue 15:4 (Cyanine blue 4044 produced by Sanyo Sikiso Co., Ltd.) | Pigment Red 122 (produced by Dainichi Seika Co., Ltd.) | Pigment Yellow 150 (E4GN-GTCH20003 produced by LANXESS Co., Ltd.) |

The pigments shown in Table 2 were purified as follows and used.

Pigments shown in Table 2 of 250 parts by weight, 2500 parts by weight of sodium chloride and 160 parts by weight of polyethylene glycol (Polyethylene glycol 300 available from by Tokyo Kasei Co., Ltd.) were mixed in a 1 gallon polystyrene kneader (produced by Inoue Seisakusho Co., Ltd.), and kneaded for 3 hours. The resulting mixture was poured into a 2.5 liter warm water and vigorously stirred in a high-speed mixer while heated to about 80° C., filtered and washed with water to remove the sodium chloride and obtain a residue. The washing was repeated five times. The resulting residue was dried, and employed as pigment in the actinic ray curable flexographic ink samples.

Evaluation of the Actinic Ray Curable Flexographic Ink Samples

The actinic ray curable flexographic ink samples obtained above were evaluated as follows:

(Curability)

Employing a flexographic printing press and the actinic ray curable flexographic ink samples, printing of ink images was done on a cotton satin fabric and a polyester fiber fabric, and the printed ink images were cured through a 20 W UV radiation device equipped with eight cold-cathode tubes. Curability was evaluated by minimum exposure energy at which tackiness of the cured printed ink images was not perceived by fingering. The lower the exposure energy (mJ/cm$^2$) is, the better the curability.

(Bleeding of Cured Ink Images)

After the ink images printed on the fabric were cured at minimum exposure energy at which tackiness of the cured printed ink images was not perceived by fingering and stored for 24 hours, bleeding of the cured ink images was visually observed. The bleeding was evaluated according to the following criteria.

A: No bleeding was observed.
B: Slight bleeding was observed, but not problematic for practical use.
C: Bleeding was observed, and was at the lowest usable level.
D: Bleeding was apparent to the extent that the print could not be put into practical use.

(Rubbing Resistance of Cured Ink Images)

The ink images printed on the fabric were cured at minimum exposure energy at which tackiness of the cured printed ink images was not perceived by fingering and rubbed 100 times employing a rubbing tester (produced by Konica Minolta Corporation). After that, layer thickness reduction of the rubbed images was observed through an optical microscope, and rubbing resistance of the cured ink images was evaluated according to the following criteria.

A: No reduction in layer thickness was observed.
B: Slight reduction in layer thickness was observed, but not problematic for practical use.
C: Reduction in layer thickness was observed, and was at the lowest usable level.
D: Marked reduction in layer thickness was observed.

(Solvent Resistance of Cured Ink Images)

The ink images printed on the fabric were cured at minimum exposure energy at which tackiness of the cured printed ink images was not perceived by fingering, and the resulting fabric was placed in a 40° C. aqueous solution containing a detergent in a washing machine, and washed for 30 minutes to wash the cured ink images. After that, layer thickness reduction of the washed images was observed through an optical microscope, and evaluated according to the following criteria.

A: No reduction in layer thickness was observed.
B: Slight reduction in layer thickness was observed, but not problematic for practical use.
C: Reduction in layer thickness was observed, and was at the lowest usable level.
D: Marked reduction in layer thickness was observed.

The results are shown in Table 3.

TABLE 3

| Flexographic ink sample No. | Curability (mJ/cm$^2$) | Bleeding resistance of cured ink images | Rubbing resistance of cured ink images | Solvent resistance of cured ink images | *Viscosity mPa·s (25° C.) | Remarks |
|---|---|---|---|---|---|---|
| 1 | 12 | B | B | B | 250 | Inv. |
| 2 | 12 | B | B | B | 300 | Inv. |
| 3 | 10 | A | A | A | 400 | Inv. |
| 4 | 12 | B | B | B | 300 | Inv. |
| 5 | 12 | B | B | B | 300 | Inv. |
| 6 | 50 | D | D | D | 250 | Comp. |
| 7 | 60 | D | D | D | 300 | Comp. |
| 8 | 45 | C | C | C | 400 | Comp. |
| 9 | 55 | D | D | D | 300 | Comp. |
| 10 | 50 | D | D | D | 300 | Comp. |

Inv.: Inventive,
Comp.: Comparative
*The viscosity was measured employing an oscillation type viscometer VISCOMATE VM-1G-MH (produced by YAMAICHI CO. LTD.)

As is apparent from Table 3 above, inventive flexographic ink sample Nos. 1 through 5, each comprising the compound represented by formula 1, provide excellent curability, bleeding resistance, rubbing resistance and solvent resistance as compared with comparative flexographic ink sample Nos. 6 through 10.

Example 2

Preparation of Actinic Ray Curable Ink-Jet Ink Samples 11 through 21

Materials as shown in Table 4 were placed in a sand mill, dispersed for 4 hours, and filtered through a membrane filter to obtain actinic ray curable ink-jet ink samples 11 through 21. In Table 4, the numerical numbers in the parentheses represent "parts by weight", and the materials used in the ink-jet ink samples are the same as those in Example 1, except for Compound F. Compound F is 2-hydroxyethylthioxanthone.

Crude copper phthalocyanine (copper phthalocyanine produced by Toyo Ink Manufacturing Co., Ltd.) of 250 parts by weight, 2500 parts by weight of sodium chloride and 160 parts by weight of polyethylene glycol (Polyethylene glycol 300 available from by Tokyo Kasei Co., Ltd.) were mixed in a 1 gallon polystyrene kneader (produced by Inoue Seisakusho Co., Ltd.), and kneaded for 3 hours. The resulting mixture was poured into a 2.5 liter warm water and vigorously stirred in a high-speed mixer while heated to about 80° C., filtered and washed with water to obtain a residue. The washing was repeated five times. The resulting reside was dried to obtain pigment P1.

Evaluation of the Actinic Ray Curable Ink-Jet Ink Samples

The actinic ray curable ink-jet ink samples obtained above were evaluated as follows:

(Curability)

Employing an ink-jet recording apparatus comprising the structure as illustrated in FIG. 2 and the actinic ray ink-jet ink samples, printing of ink images was done on a cotton satin fabric and a polyester fiber fabric, and the printed ink images were cured through a 20 W UV radiation device equipped with eight cold-cathode tubes. Curability was evaluated by minimum exposure energy at which tackiness of the cured printed ink images was not perceived by fingering. The lower the exposure energy (mJ/cm$^2$) is, the better the curability.

(Bleeding of Cured Ink Images)

After the ink images printed on the fabric were cured at minimum exposure energy at which tackiness of the cured printed ink images was not perceived by fingering and stored for 24 hours, bleeding of the cured ink images was visually observed. The bleeding was evaluated according to the following criteria.

A: No bleeding was observed.
B: Slight bleeding was observed, but not problematic for practical use.

TABLE 4

| Ink jet ink sample Nos. | Pigment P1 | Oxetane compound (*) OXT221 | OXT101 | OXT212 | Oxirane compound (*) CEL2021P | EP-17 | Sulfonium salt (*) S-1 | S-2 | S-3 | Iodonium salt (*) I-1 | Remarks |
|---|---|---|---|---|---|---|---|---|---|---|---|
| 1 | (5) | (55) | (5) | (10) | (20) | — | (2.5) | — | — | — | Inv. |
| 2 | (5) | (55) | (5) | (10) | (20) | — | (2.5) | — | — | — | Inv. |
| 3 | (5) | (55) | (5) | (10) | (20) | — | — | (2.5) | — | — | Inv. |
| 4 | (5) | (55) | (5) | (10) | — | (20) | — | (2.5) | — | — | Inv. |
| 5 | (5) | (55) | (5) | (10) | — | (20) | — | — | (2.5) | — | Inv. |
| 6 | (5) | (55) | (5) | (10) | — | (20) | — | — | — | (2.5) | Inv. |
| 7 | (5) | (55) | (5) | (10) | (20) | — | (2.5) | — | — | — | Comp. |
| 8 | (5) | (55) | (5) | (10) | (20) | — | (2.5) | — | — | — | Comp. |
| 9 | (5) | (55) | (5) | (10) | (20) | — | — | (2.5) | — | — | Comp. |
| 10 | (5) | (55) | (5) | (10) | — | (20) | — | — | (2.5) | — | Comp. |
| 11 | (5) | (55) | (5) | (10) | — | (20) | — | — | — | (2.5) | Comp. |

| Ink jet ink sample Nos. | Exemplified Compound of formula 1 A (*) | B (*) | C (*) | D (*) | E (*) | F (*) | Comparative compound a) (*) | b) (*) | c) (*) | d) (*) | e) (*) | Remarks |
|---|---|---|---|---|---|---|---|---|---|---|---|---|
| 1 | (1) | — | — | — | — | — | — | — | — | — | — | Inv. |
| 2 | — | (1) | — | — | — | — | — | — | — | — | — | Inv. |
| 3 | — | — | (1) | — | — | — | — | — | — | — | — | Inv. |
| 4 | — | — | — | (1) | — | — | — | — | — | — | — | Inv. |
| 5 | — | — | — | — | (1) | — | — | — | — | — | — | Inv. |
| 6 | — | — | — | — | — | (1) | — | — | — | — | — | Inv. |
| 7 | — | — | — | — | — | — | (1) | — | — | — | — | Comp. |
| 8 | — | — | — | — | — | — | — | (1) | — | — | — | Comp. |
| 9 | — | — | — | — | — | — | — | — | (1) | — | — | Comp. |
| 10 | — | — | — | — | — | — | — | — | — | (1) | — | Comp. |
| 11 | — | — | — | — | — | — | — | — | — | — | (1) | Comp. |

Inv.: Inventive,
Comp.: Comparative
(*): Parts by weight
Note:
The viscosity at 25° C. of the ink jet ink samples in Table 4 was in the range of from 28 to 32 mPa·s.

C: Bleeding was observed, and was at the lowest usable level.
D: Bleeding was apparent to the extent that the print could not be put into practical use.

(Rubbing Resistance of Cured Ink Images)

The ink images printed on the fabric were cured at minimum exposure energy at which tackiness of the cured printed ink images was not perceived by fingering and rubbed 100 times employing a rubbing tester (produced by Konica Minolta Corporation). After that, layer thickness reduction of the rubbed images was observed through an optical microscope, and rubbing resistance of the cured ink images was evaluated according to the following criteria.

A: No reduction in layer thickness was observed.
B: Slight reduction in layer thickness was observed, but not problematic for practical use.
C: Reduction in layer thickness was observed, and was at the lowest usable level.
D: Marked reduction in layer thickness was observed.

(Solvent Resistance of Cured Ink Images)

The ink images printed on the fabric were cured at minimum exposure energy at which tackiness of the cured printed ink images was not perceived by fingering, and the resulting fabric was placed in a 40° C. aqueous solution containing a detergent in a washing machine, and washed for 30 minutes to wash the cured ink images. After that, layer thickness reduction of the washed images was observed through an optical microscope, and evaluated according to the following criteria.

A: No reduction in layer thickness was observed.
B: Slight reduction in layer thickness was observed, but not problematic for practical use.
C: Reduction in layer thickness was observed, and was at the lowest usable level.
D: Marked reduction in layer thickness was observed.

The results are shown in Table 5.

TABLE 5

| Ink-jet ink sample No. | Curability (mJ/cm²) | Bleeding resistance of cured ink images | Rubbing resistance of cured ink images | Solvent resistance of cured ink images | Remarks |
|---|---|---|---|---|---|
| 11 | 6 | B | B | B | Inv. |
| 12 | 7 | B | B | B | Inv. |
| 13 | 5 | A | A | A | Inv. |
| 14 | 5 | A | A | A | Inv. |
| 15 | 7 | B | B | B | Inv. |
| 16 | 7 | B | B | B | Inv. |
| 17 | 17 | D | C | D | Comp. |
| 18 | 20 | D | C | D | Comp. |
| 19 | 15 | C | C | C | Comp. |
| 20 | 18 | D | C | D | Comp. |
| 21 | 20 | D | C | D | Comp. |

Inv.: Inventive,
Comp.: Comparative

As is apparent from Table 5 above, inventive ink-jet ink sample Nos. 11 through 16, each comprising the compound represented by formula 1, provide excellent curability, bleeding resistance, rubbing resistance and solvent resistance as compared with comparative ink-jet ink sample Nos. 17 through 21.

What is claimed is:

1. An actinic ray curable composition comprising:
a cationically polymerizable composite in an amount of from 5 to 95% by weight, in which the cationically polymerizable composite comprises an oxetane ring-containing compound and an oxirane ring-containing compound;
an onium salt; and
a compound represented by formula 1, $$R^1\{(CR^2R^3)_m OH\}_n \qquad \text{Formula 1}$$

wherein $R^1$ represents a condensed ring group; $R^2$ and $R^3$ independently represent a hydrogen atom, a substituted or unsubstituted alkyl group, a substituted or unsubstituted aryl group or a substituted or unsubstituted aralkyl group; m represents an integer of from 2 to 4; and n represents an integer of from 1 to 10.

2. The actinic ray curable composition of claim 1, wherein the condensed ring represented by $R^1$ is selected from the group consisting of an anthracene ring, a fluorene ring, a pyrene ring, a chrysene ring, a phenanthrene ring, an anthraquinone ring, a perylene ring, a carbazole ring, a phenothiazine ring, a thioxanthone ring, a thianthrene ring, a benzanthracene ring, a naphthacene ring, and a triphenylene ring.

3. The actinic ray curable composition of claim 1, wherein n of formula 1 represents an integer of from 1 to 4.

4. The actinic ray curable composition of claim 1, wherein the onium salt is an iodonium salt or a sulfonium salt.

5. The actinic ray curable composition of claim 1, wherein the content of the compound represented by formula 1 is from 0.01 to 20% by weight, and the content of the onium salt is from 0.2 to 20% by weight.

6. The actinic ray curable composition of claim 1, wherein the composition has a viscosity at 25° C. of from 5 to 500 mPa·s.

7. The actinic ray curable composition of claim 1, wherein the composition further contains at least one selected from the group consisting of polyesters, polyurethanes, vinyl resins, acryl resins, rubber resins, and waxes.

8. An actinic ray curable ink comprising:
a cationically polymerizable composite in an amount of from 5 to 95% by weight, in which the cationically polymerizable composite comprises an oxetane ring-containing compound and an oxirane ring-containing compound;
an onium salt;
a pigment; and
a compound represented by formula 1, $$R^1\{(CR^2R^3)_m OH\}_n \qquad \text{Formula 1}$$

wherein $R^1$ represents a condensed ring group; $R^2$ and $R^3$ independently represent a hydrogen atom, a substituted or unsubstituted alkyl group, a substituted or unsubstituted aryl group or a substituted or unsubstituted aralkyl group; m represents an integer of from 2 to 4; and n represents an integer of from 1 to 10.

9. The actinic ray curable ink of claim 8, wherein the condensed ring is selected from the group consisting of an anthracene ring, a fluorene ring, a pyrene ring, a chrysene ring, a phenanthrene ring, an anthraquinone ring, a perylene ring, a carbazole ring, a phenothiazine ring, a thioxanthene ring, a thianthrene ring, a benzanthracene ring, a naphthacene ring, and a triphenylene ring.

10. The actinic ray curable ink of claim 8, wherein n of formula 1 represents an integer of from 1 to 4.

11. The actinic ray curable ink of claim 8, wherein the onium salt is an iodonium salt or a sulfonium salt.

12. The actinic ray curable ink of claim 8, wherein the ink has a viscosity at 25° C. of from 5 to 500 mPa·s.

13. The actinic ray curable ink of claim 8, wherein the ink further contains at least one selected from the group consisting of polyesters, polyurethanes, vinyl resins, acryl resins, rubber resins, and waxes.

14. The actinic ray curable ink of claim 8, wherein the content of the compound represented by formula 1 is from 0.01 to 20% by weight, the content of the onium salt is from 0.2 to 20% by weight, and the content of the pigment is from 3 to 50% by weight.

15. An image formation process comprising the step of printing an ink image on a recording sheet comprising fibers employing the actinic ray curable ink of claim 8.

* * * * *